March 10, 1953 T. F. MURR 2,631,028
TORCH CUTTING MACHINE
Filed May 14, 1946 2 SHEETS—SHEET 1

INVENTOR
Thomas F. Murr
BY
Dean Fairbanks Hirsch
ATTORNEYS

March 10, 1953     T. F. MURR     2,631,028
TORCH CUTTING MACHINE
Filed May 14, 1946     2 SHEETS—SHEET 2
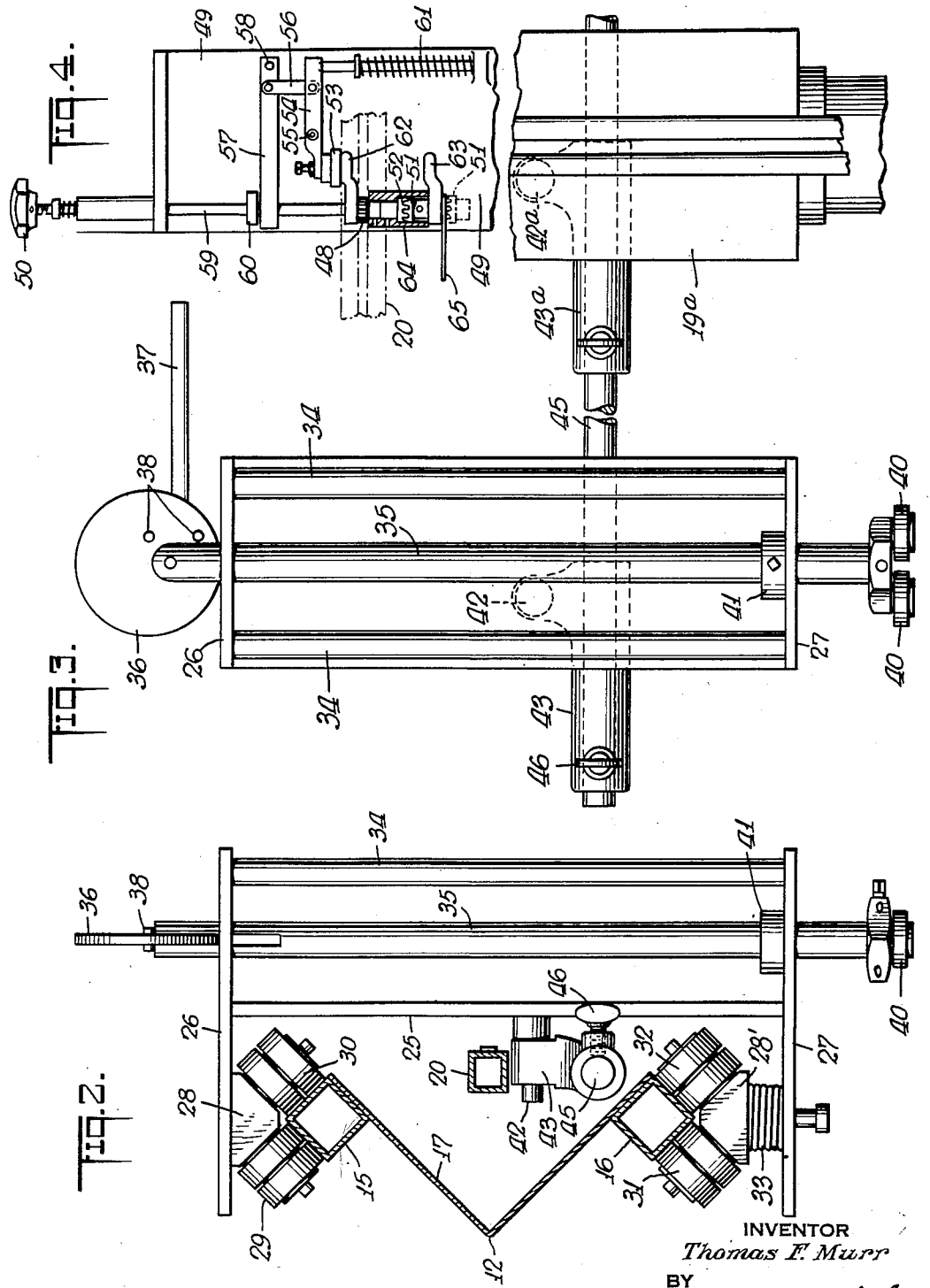
INVENTOR
*Thomas F. Murr*
BY
*Dean Fairbank & Hirsch*
ATTORNEY Patented Mar. 10, 1953

2,631,028

UNITED STATES PATENT OFFICE 2,631,028

TORCH CUTTING MACHINE

Thomas F. Murr, Chicago, Ill., assignor to National Cylinder Gas Company, Chicago, Ill., a corporation of Delaware Application May 14, 1946, Serial No. 669,506

14 Claims. (Cl. 266—23)

This invention relates to that type of torch cutting machine in which there is provided a carriage mounted for straight line horizontal movement and having mounted thereon a tracer and torch connected together for straight line movement along the carriage and in a direction at right angles to the direction of movement of the carriage, that is, movement transverse to that of the carriage.

Machines of this type are shown in Patents 2,269,636, 2,336,596, 2,336,626, 2,356,215, 2,364,644 and 2,364,645.

I do not claim to have made any improvement in the carriage, main motor driven tracer unit, or cutting torch support, and therefore the parts may be of any type to which the invention is applicable. Merely for purposes of illustration I have shown and may use a carriage of the type shown in said patents; a cutting torch supporting and adjusting means of the type shown and claimed in Patent 2,336,596; and a tracing unit of the type shown and claimed in Patent 2,336,626. The inventions shown in the other patents above referred to may also be used in connection with the present invention.

The machines of said patents are specially adapted to have two or more torches connected to and controlled by a single motor driven tracer unit so that a plurality of cuts of the same kind and shape may be made at the same time with the torches movable with and along a single carriage.

The main object of the present invention is to provide means whereby a plurality of torches may be mounted for movement along and with a single carriage so that a plurality of separate cuts may be made at the same time but may be of different or the same shape and kind. In carrying out my invention I provide an auxiliary tracer so that two torches may be connected to the same tracer or to separate tracers, depending upon the selected operating connections between the torches and the tracers, or tracer, and whether the desired cuts are the same or different. It is not necessary that more than one of the tracers be provided with a motor, as the auxiliary tracer or tracers may be guided by templates as the motor driven tracer moves along and with the carriage. In other words, the auxiliary tracer may be and, as described and illustrated herein, preferably is merely a non-driven or idling pattern following device.

As shown in the prior patents above referred to, the tracer and torches are supported on rails on the carriage, and the torch and tracers are connected by a bar extending lengthwise of the carriage. In my present invention the auxiliary tracer may be supported on said rails in substantially the same way as the main tracer, and an auxiliary bar extends lengthwise of the carriage parallel to the first mentioned bar so that one tracer and its torch may be connected by one bar, and another tracer and its torch may be connected by another bar. Thus, one or more torches may be connected to either the main tracer unit or the auxiliary tracer unit, whereby such torch or torches may be controlled from either tracer unit, as may be desired.

As a further importance feature of the invention the auxiliary tracer is provided with a suitable mechanism whereby the tracing roller or other element may be readily lifted out of engagement with a template and the unit thus rendered inoperative for controlling cutting operations.

In the accompanying drawing there is shown a construction embodying my present invention.

In the drawing

Fig. 2 is a side elevation of the auxiliary tracer unit, the supporting rails being shown in cross section;

Fig. 3 is a front view of the auxiliary tracer unit with its connection to a torch carrying unit, and Fig. 4 is a front view of a portion of one of the torch cutting units.

Figure 1:
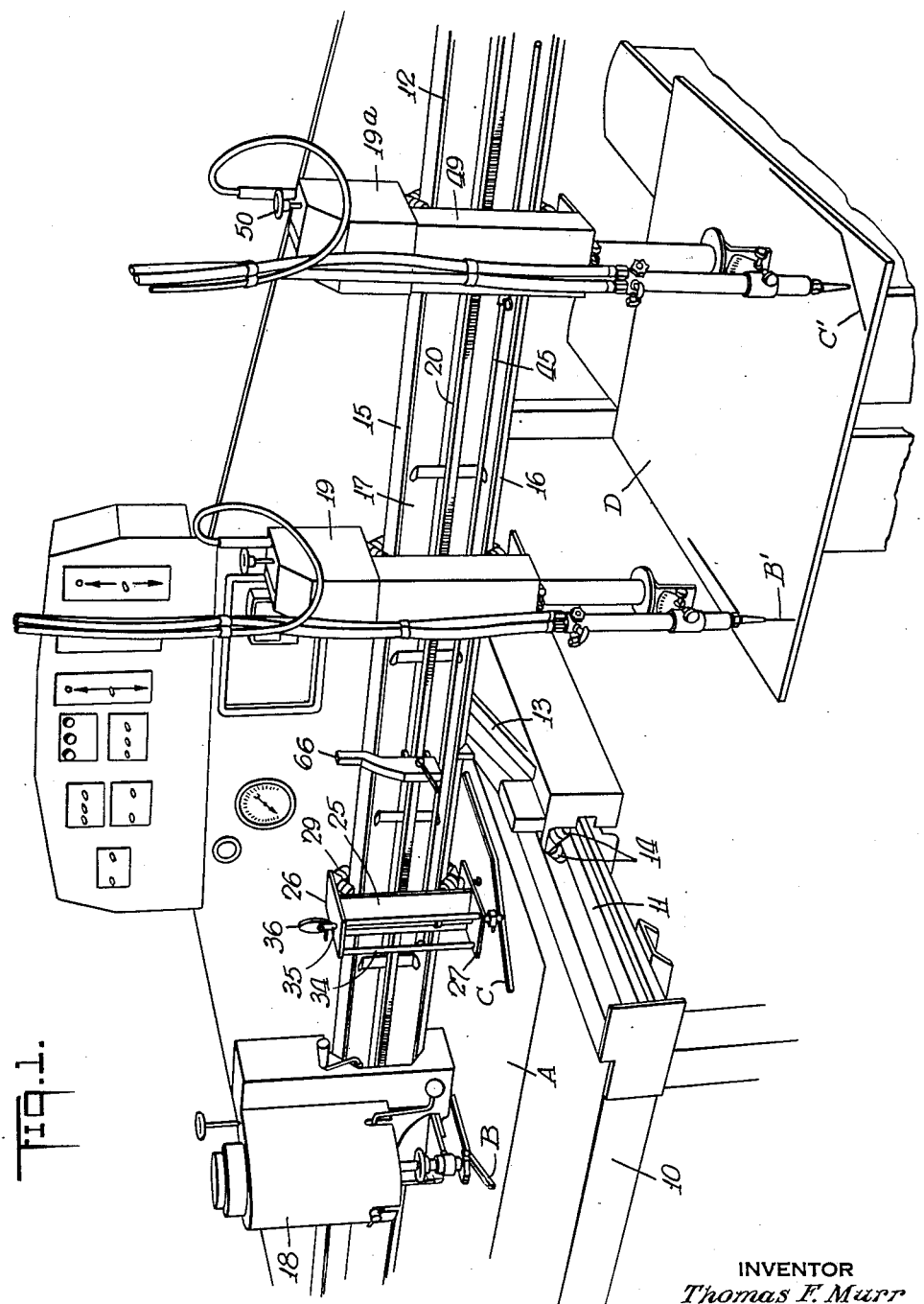
Fig. 1 is a perspective view of a machine embodying my invention.

I have illustrated my invention in connection with a type of machine in which there is a table 10 for supporting the pattern such as a template, drawing, or the like. This table has a pair of rails, only one, 11, of which is shown, and on which rails there is mounted a carriage 12 movable in a direction parallel to said rails.

The carriage is shown as having a transverse supporting member 13 having rollers 14 engaging the rail 11, and includes a pair of rails 15 and 16 connected together by a frame part 17. Mounted on the upper rail 15 and held against transverse movement by the lower rail 16 is a motor operated tracing unit 18, which may be of the type shown in the Mott & Chouinard Patent 2,336,626, and also similarly mounted upon the carriage is a torch cutting unit 19 which may be of the type shown in the Mott & Chouinard Patent No. 2,336,596. Movable longitudinally of the carriage is a rack bar 20 which may be rigidly clamped to the tracing unit 18 and the torch cutting unit 19 so that as the tracing unit follows the pattern on the table, the carriage is caused to move transversely of the table, and the torch carrying unit and the tracer unit are caused to move longitudinally of the carriage as the tracer follows the pattern presented on the table. For simultaneously forming a plurality of cuts there is provided a second torch cutting unit 19a which may be identical with the torch cutting unit 19, and both may be clamped to the rack bar 20.

All of the parts so far described may be the same as is shown in the various patents hereinbefore referred to and need not be further described.

In carrying out my invention I provide an auxiliary tracing unit, the structural details of which are relatively unimportant except as hereinafter claimed, but as illustrated in Figs. 2 and 3, it includes a back wall 25 and top and bottom members 26 and 27. The rearwardly extending portion of the top member 26 has a bracket 28 provided with rollers 29 and 30 having diagonal axes and engaging the upper track 15. The rearwardly extending portion of the bottom member 27 has a bracket 28' carrying similar rollers 31 and 32 engaging the under surfaces of the lower rail 16. The bracket 28' may be supported on a spring 33 so that the snug engagement of all four rollers with the two rails is effected. The front corners of the forwardly extending portions of the members 26 and 27 may be rigidly connected by a pair of corner posts 34.

Mounted in the members 26 and 27 is a vertical movable rod 35 pivotally supporting a cam 36 resting upon the top member 26. The cam has a handle 37 and a pair of pins or stops 38. With the cam in the position shown in Figs. 2 and 3 the rod 35 is in its lowermost position and one of the stops 38 is against the side of the rod. By lifting the handle 37 and rotating the cam 36 through approximately 180 degrees the rod will be raised to its uppermost position and the other stop 38 will engage with the other side of the rod 35.

The rod 35, at its lower end, has a bracket carrying a pair of rollers 40 which are disposed in the same horizontal plane and are spaced a short distance apart so as to receive therebetween a flange of a template, as will be more fully described hereinafter. When the rollers 40 are in engagement with the template, the weight of the rod 35 and rollers is supported by a collar 41 vertically adjustable on the rod 35 and engaging the member 27.

This auxiliary tracer unit is mounted on the portion of the carriage 12 which is over the table 10 and is between the main motor-operated tracer unit 18 and the first torch cutting unit 19. Means are provided for connecting this auxiliary tracer unit to one of the torch cutting units, for instance to the unit 19a.

As shown, the rear of the back wall 25 carries a rearwardly extending stud bolt 42 on which is mounted a bracket 43. This bracket has an opening therethrough to receive a rod 45 which is disposed below and parallel to the rack bar 20 and is adjustably secured to the bracket by a clamping screw 46.

This rod or bar 45 may be connected to the first torch cutting unit 19, but, as illustrated, it extends past the first unit 19 and may be detachably secured to the torch cutting unit 19a. For this purpose there is provided a bracket 43a which may be identical with the bracket 43 and detachably clamped to the rod 45 secured to the rear of the torch cutting unit 19a by a stripper bolt 42a similar to the bolt 42. Thus, by means of the rod 45, the auxiliary tracer unit may be secured to one of the torch cutting units.

When the auxiliary tracer unit is used, this torch cutting unit is freed from locking engagement with the rack bar 20. As shown in 2,336,596, such locking means may comprise a clutch shoe or brake pad carried by the cutting torch unit and held against a surface of the rack bar 20. As shown in Fig. 4, the casing 49 of the cutting torch unit 19a has a handle 50 connected to a clutch member 51. The other clutch member 52 is connected to the pinion 48 engaging the rack of the bar 20. The brake shoe or pad 53 is carried by an arm 54 pivoted at 55 and connected by a link 56 to a second arm 57 pivoted at 58. The rod 59 of the handle 50 has a stop 60 for engaging the upper surface of the arm 57. A spring 61 acts on the arm 54 to hold the brake shoe 53 in operative position. The clutch members 51 and 52 are housed in a casing 64 which is supported on the casing 49 between guides 62 and 63.

With the parts in the position shown, the casing of the torch cutting unit is locked to the rack bar 20. By depressing the handle 50, the brake shoes 53 are released, and the clutch member 51 will be lowered to the dotted line position and may be locked down in inoperative position in a suitable manner as for instance by inserting a plate 65 or similar stop beneath the guide 63 and above the clutch member 51. The pinion 48 is then free to rotate, and the torch cutting unit 19a is free to be moved by the rod 45 from the auxiliary tracer unit.

In operation, the motor-powered tracer unit 18 will actuate and control the torch cutting unit 19, while the auxiliary tracer unit will control the torch cutting unit 19a. For instance, if it be desired to simultaneously cut the two opposite edges of a plate and along lines which are not parallel, a template A may be placed on the table with raised flanges B and C, and the motor-operated tracer unit will follow the flange B, while the non-driven auxiliary tracer unit will follow the flange C. Thus, on the plate D which is to be cut there will be simultaneously formed non-parallel cuts B' and C' which will correspond in position to the non-parallel flanges B and C on the template plate A. The motor-driven tracer unit may be guided over a drawing, or may have rollers or other parts following a template.

This is merely one illustration of how two non-parallel cuts may be simultaneously made by the action of two tracer units operating on the same template plate.

When it is desired to cut parallel lines the cam 36 may be operated to lift rollers 40 from the template plate, and the brake shoe 53 and clutch members 51 and 52 of the torch cutting unit 19a are engaged so that this unit will be operatively connected to the rack bar 20. Thus, both torch cutting units will be operated by the same motor-operated tracer unit, and the auxiliary tracer unit will be free to float back and forth along the rails. Where it is desired to cut two or more lines which are parallel with the track 11, the rack bar 20 may be locked to the carriage by any suitable means such as brake shoes on a bracket 66 secured to the carriage so that the cutting torches are held against movement in respect to the carriage.

In some instances it may be desired to add a second auxiliary tracer unit and connect it to a third torch cutting unit by an additional rod 45.

Various changes may be made in details of construction of the apparatus and within the scope of my invention.

Having thus described my invention, what I claim as new and desire to secure by Letters Patent is:

1. A torch cutting machine including a movable carriage, a motor driven tracer unit and an auxiliary tracer unit independently movable along the length of said carriage simultaneously with movement of said carriage, a template for guiding the auxiliary tracer unit along the length of said carriage, a pair of cutting torch units, one connected to the motor driven tracer unit and the other to the auxiliary tracer unit, and means for moving said auxiliary tracer unit into and out of engagement with said template.

2. A torch cutting machine including a movable carriage, and having mounted thereon a motor driven tracer unit, a separate tracer unit, and a pair of cutting torch units, means for detachably connecting both of said torch units to one of said tracer units, and means for detachably connecting one only of said cutting units to the other of said tracer units.

3. A cutting torch machine for simultaneously making a plurality of cuts of the same or different shapes, said machine having a carriage movable horizontally in a straight line, a plurality of cutting torches and a plurality of tracer units all mounted on said carriage and movable in respect thereto in a direction at right angles to the direction of movement of said carriage, disengageable means for connecting all of said torches to one of said tracer units, and disengageable means for connecting at least one of said cutting torches to a separate tracer unit.

4. A cutting torch machine for simultaneously making a plurality of cuts of the same or different shapes, said machine having a carriage movable horizontally in a straight line, a plurality of cutting torches and a plurality of tracer units all mounted on said carriage and movable in respect thereto in a direction at right angles to the direction of movement of said carriage, a motor for driving one of said tracer units, separate guiding templates for said tracer units, means for connecting all of the cutting torches to one tracer unit, and means for connecting at least one of said cutting torches to another of said tracer units.

5. A torch cutting machine adapted for the simultaneous cutting of metal parts along similar or different paths, said machine having a carriage movable horizontally in a straight line, a pair of tracers and a pair of cutting torches all mounted on said carriage and movable in respect thereto in a direction at right angles to the direction of movement of said carriage, a pair of bars extending lengthwise of said carriage, means for securing one of said tracers and one of said cutting torches to one of said bars, means for securing the other of said tracers to the other bar, and means for securing the other of said cutting torches to either of said bars.

6. A torch cutting machine including a carriage mounted for straight line horizontal movement, a plurality of cutting torches mounted on said carriage and movable along said carriage in a direction at right angles to the direction of movement of the carriage, a pair of tracer units mounted on said carriage and independently movable lengthwise of said carriage simultaneously with movement of said carriage, one of said tracer units being driven to move said carriage, and separate connections between each tracer and a corresponding one of said cutting torches.

7. A torch cutting machine comprising in combination, a horizontally movable carriage; a plurality of cutting torch carrying units supported thereon for movement transverse to that of said carriage; a driven tracer unit supported on said carriage for moving the same and connectable to at least one of said torch carrying units to control its movement transversely to the movement of said carriage; and at least one non-driven pattern following device supported on said carriage and connectable to at least one of said cutting torch carrying units to control the transverse movement thereof to cause the same to follow a path corresponding to that followed by said pattern following device, said driven tracer unit and said pattern following device being movable lengthwise of the carriage simultaneously with movement of the carriage.

8. A torch cutting machine comprising in combination, a horizontally movable carriage; a plurality of cutting torch carrying units supported thereon for movement transverse to that of said carriage; a motor-operated tracer unit supported on said carriage for moving the same and connectable to at least one of said torch carrying units to control its movement transversely to the movement of said carriage; and at least one non-driven pattern following device supported on said carriage and connectable to at least one of said cutting torch carrying units to control the transverse movement thereof to cause the same to follow a path corresponding to that followed by said pattern following device, said motor-operated tracer unit and said pattern following device being movable lengthwise of the carriage simultaneously with movement of the carriage.

9. A torch cutting machine adapted simultaneously to make a plurality of cuts along a plurality of different paths comprising, in combination, a horizontally movable carriage; a plurality of cutting torch carrying units supported thereon for movement transverse to that of said carriage; a motor-operated tracer unit supported on said carriage for moving the same and connectable to at least one of said torch carrying units to control the movement thereof transversely to the movement of said carriage and to cause it to follow a predetermined path; and at least one non-driven pattern following device supported on said carriage and connectable to at least one of said cutting torch carrying units to control the transverse movement thereof to cause the same to follow a path corresponding to that followed by said pattern following device, which path is different from that followed by torch carrying units controlled by said motor-operated tracer unit, said motor-operated tracer unit and said pattern following device being movable lengthwise of the carriage simultaneously with movement of the carriage.

10. A torch cutting machine comprising, in combination, a horizontally movable carriage; a plurality of cutting torch carrying units supported thereon for movement transverse to that of said carriage; a motor-operated tracer unit supported on said carriage for moving the same and connectable to at least one of said torch carrying units to control its movement transversely to the movement of said carriage; and at least one non-driven pattern following device supported on said carriage and connectable to at least one of said cutting torch carrying units to control the transverse movement thereof to cause the same to follow a path corresponding to that followed by said pattern following device, said motor-operated tracer unit and said pattern following device being movable lengthwise of the carriage simultaneously with movement of the carriage.

11. A torch cutting machine adapted simultaneously to make two cuts along non-parallel paths comprising, in combination, a carriage horizontally movable in a straight line; two cutting torch carrying units supported thereon for movement transverse to that of said carriage; a motor-operated tracer unit supported on said carriage for moving the same and connectable to one of said torch carrying units to control the movement thereof transversely to the movement of said carriage to cause it to follow a predetermined path; and a non-driven auxiliary tracer unit supported on said carriage between said motor-operated tracer unit and said cutting torch carrying units and connectable to the other of said cutting torch carrying units to control the transverse movement thereof to cause the same to follow a path corresponding to that followed by said auxiliary tracer unit, which path is different from that followed by the torch carrying unit controlled by said motor-operated tracer unit, said motor operated tracer unit and said auxiliary tracer unit being movable lengthwise of the carriage simultaneously with movement of the carriage.

12. A torch cutting machine in which there is provided a horizontally movable carriage, a motor-driven tracer unit mounted on said carriage movable therewith and lengthwise thereof, a cutting torch mounted on said carriage movable simultaneously therewith and lengthwise thereof and adjustably secured to said tracer unit, a second tracer unit mounted on said carriage movable simultaneously therewith and lengthwise thereof independently of said first mentioned tracer unit, a second cutting torch mounted on said carriage movable therewith and lengthwise thereof and secured to said second tracer, whereby said cutting torches may follow different paths corresponding to the path followed by the tracer connected thereto.

13. A torch cutting machine including a carriage movable back and forth in one direction, a main driven tracer unit and an auxiliary tracer unit each having a tracer wheel, said units being separately mounted on said carriage and each movable lengthwise thereof at right angles to the direction of movement of said carriage and simultaneously therewith, a pair of torch cutting units on said carriage, means for connecting one of said cutting torch units to one tracer unit, means for connecting the other of said cutting torch units to the other tracer unit, a stationary template, said auxiliary tracer unit having a tracer wheel adapted to engage with and be guided by said template, another template for said driven tracer, means for supporting the tracer wheel of said auxiliary tracer unit in or out of engagement with its template, and controllable means for holding said tracer units against movement in respect to each other when its tracer wheel is out of engagement with said template and said driven tracer is in engagement with its template.

14. A torch cutting machine including a carriage movable back and forth in one direction, a driven tracer unit and an idler tracer unit separately mounted on said carriage and each movable lengthwise thereof at right angles to the direction of movement of said carriage, a pair of torch cutting units on said carriage, means for connecting one of said torch cutting units to said driven tracer unit, means for connecting the other of said torch cutting units to said idler tracer unit, stationary templates adapted to be engaged by and to guide said tracer units whereby said torch cutting units are caused to follow independent paths corresponding to the respective templates engaged by the tracer unit connected thereto, means for supporting said idler tracer unit out of engagement with its template, and controllable means for holding said tracer units against movement with respect to each other when said idler tracer unit is out of engagement with its template and said driven tracer is in engagement with its template, whereby said driven tracer unit is guided by its template to cause both of said torch cutting units to follow parallel paths.

THOS. F. MURR.

REFERENCES CITED

The following references are of record in the file of this patent:

UNITED STATES PATENTS

| Number | Name | Date |
| --- | --- | --- |
| 1,079,910 | Anderson | Nov. 25, 1913 |
| 1,879,444 | Ost et al. | Sept. 27, 1932 |
| 1,928,121 | Anderson | Sept. 26, 1933 |
| 1,999,787 | Sassen | Apr. 30, 1935 |
| 2,006,121 | Tham | June 25, 1935 |
| 2,336,626 | Mott et al. | Dec. 14, 1943 |
| 2,364,645 | Mott et al. | Dec. 12, 1944 |
| 2,397,933 | Fowle et al. | Apr. 9, 1946 |
| 2,477,041 | Buckram et al. | July 26, 1949 |

FOREIGN PATENTS

| Number | Country | Date |
| --- | --- | --- |
| 354,389 | Great Britain | Aug. 10, 1931 |
| 46,499 | France | June 4, 1936 |
| 626,443 | France | May 9, 1927 |